(No Model.)
W. B. FLINN.
CAR BRAKE.
No. 471,635. Patented Mar. 29, 1892.
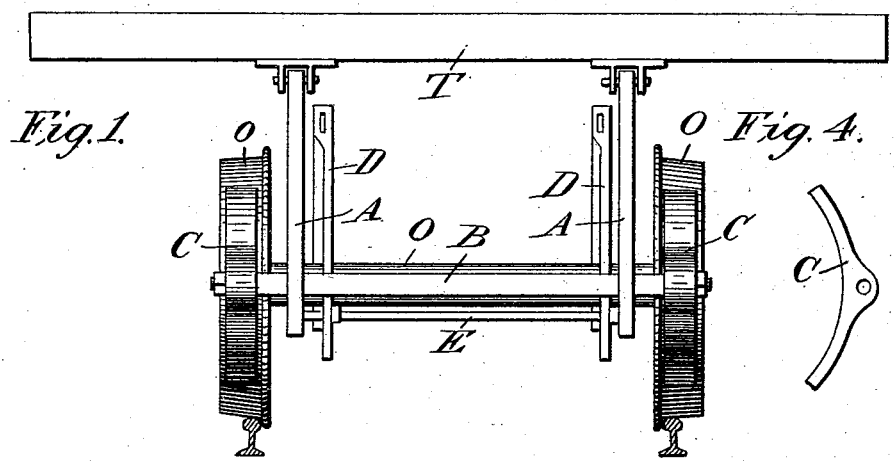
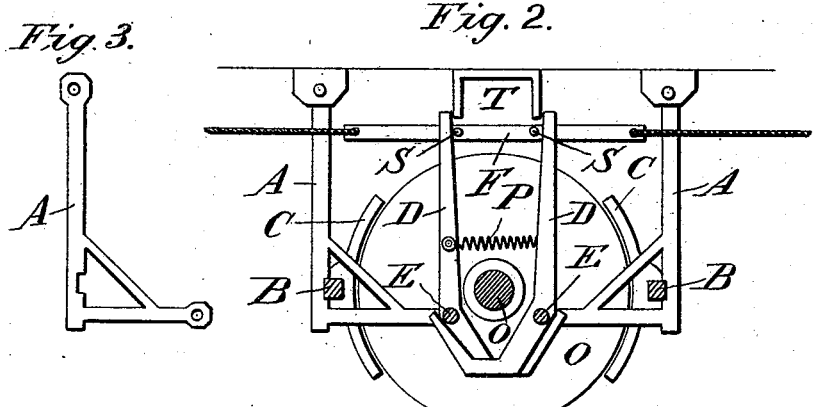
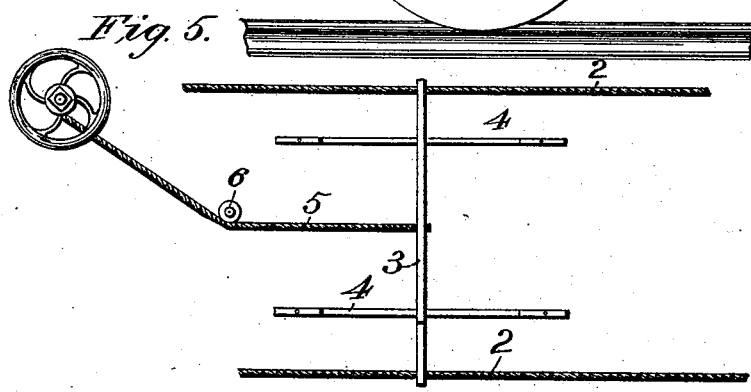
Witnesses:
Chas. J. Stanley
Cress Unger
Inventor:
William B. Flinn

UNITED STATES PATENT OFFICE.

WILLIAM B. FLINN, OF SAN FRANCISCO, CALIFORNIA.

CAR-BRAKE.

SPECIFICATION forming part of Letters Patent No. 471,635, dated March 29, 1892.

Application filed April 9, 1891. Serial No. 388,337. (No model.)

*To all whom it may concern:*

Be it known that I, WILLIAM B. FLINN, a citizen of the United States of America, residing in the city and county of San Francisco, State of California, have invented a new and useful Brake for Railroad-Cars, which can be applied by steam and by hand; and I do hereby declare that the following is a full, clear, and exact description of the same, reference being had to the annexed drawings, making a part of this specification.

The object of my invention is to stop a train of cars in less time than by any means now in use.

Figure 1 is made to represent a pair of wheels resting on the track with the brake in position on either side. Fig. 2 is a transverse section through Fig. 1. Fig. 3 is a side view of A A, Fig. 1. Fig. 4 is a side view of C C. Fig. 5 shows the arrangement for braking cars by hand.

O O O are the wheels and axle.

T is the bottom of car.

Of the parts referred to, A A are hangers formed like Fig. 3. The part B is bolted onto the hangers. The ends of B are rounded and shouldered and threads formed on the extreme ends for nuts. The parts C C are made in form like Fig. 4, and are fixed on the ends of B and fastened with nuts, the whole suspended in front of wheels and exactly the same in rear, as shown in section, Fig. 2. A A, B, and E are securely connected together and suspended from the bottom of the car in the strongest manner to swing freely. The ends of B are prepared to receive parts C C, which when in position will fit the wheels exactly, and are fastened with nuts.

D D are the levers.

E is a round bar on which the levers are placed, the points of levers being under the bar at the opposite side of axle, as set forth more clearly in Fig. 2, in which D D are the levers and E the bar in which the levers act.

P is a small spring made fast to both levers.

T is a stop for the levers.

F is made to slide through openings in levers, and with the pins S S through F the brakes can be pulled equally from both ends and when pulled from either end will grip the wheels front and rear. The spring brings them back to place when let go. Two pairs of wheels only of each car need be provided with these brakes.

To connect the brakes, there will be two (2) wire cords of proper size resting on rollers, the cords made fast to F, Fig. 2, and then from the other ends of F to the center between cars when coupled. The ends of cords are to be prepared for coupling, allowance being made for the freedom in car-couplings. The cars and brake-pulls can be coupled at the same time.

To apply steam-power, it is only required to have a small cylinder on the locomotive-tender fast to the bottom in center and between the front and rear wheels, and the steam being connected from the locomotive the connection with the brake-pulls is easily arranged. When the power is applied, the brakes of all the cars in the train will act at the same moment.

To brake one or more cars by hand, it can be arranged as shown in Fig. 5.

2 2 is the main cord.

$3^a$ is a bar fast to the cords in the most convenient place and resting on two supports similar to 4.

5 is an extra piece of cord fast to the bar in the center and held in line by roller 6. It can be pulled by hand-crank, as usual.

The brake when suspended, as shown, may come within one inch of the wheel, if so desired. It cannot touch the wheel by swinging against it, nor can it swing away from the wheel after being fixed.

The brakes on each car are connected by a wire cord or chain, made fast to the end of piece F, Fig. 2, in each brake and resting on rollers, as already described. From the other ends of F the cord is extended and connected by couplings to the brakes of the adjoining cars.

The operation of levers D D is as follows: F, Fig. 2, is a thin piece. It slides in a slot or opening in levers. The opening is shown in D D, Fig. 1. It will be understood that only the front levers of each brake are used. The pins S S at the back of levers project across the opening in lever. When F is pulled from the front, it pulls the front lever and slides in the rear lever. The spring P holds the levers in place. It holds the rear lever tight up to the stop T while the front ones are in operation, and brings them back to place when the power is shut off. When the top end of lever is pulled forward, as described, the bottom end slides upward on the round bar E and brings the brake tight up to the wheels instantly.

I am not aware that there has ever been a similar brake in use or anything operated by levers to press the wheels on both sides, nor am I aware that any part of my device is in public use, except part Fig. 4.

I am aware that prior to my invention car-brakes have been made with brake-hangers, brake-beam, and brake-shoes. I therefore do not claim such a combination, broadly; but What I do claim is—

1. The hanger A, provided with an arm extending toward the axle, in combination with the bar E, substantially as described.

2. The combination of the levers D D and the bars e e, the lower ends of the former projecting under the latter for the purpose of drawing them together, substantially as described.

3. The combination of the levers D D, spring P, and stop T, substantially as described.

4. The combination of the levers D D, having slots in their upper ends, the bar F therein, provided with stops S S, and the train-cord, all substantially as described.

WILLIAM B. FLINN.

Witnesses:
CRESS UNGER,
CHAS. T. STANLEY.